2 Sheets—Sheet 1.
D. G. STERLING.
Corn Planter and Drill.
No. 212,115.      Patented Feb. 11, 1879.
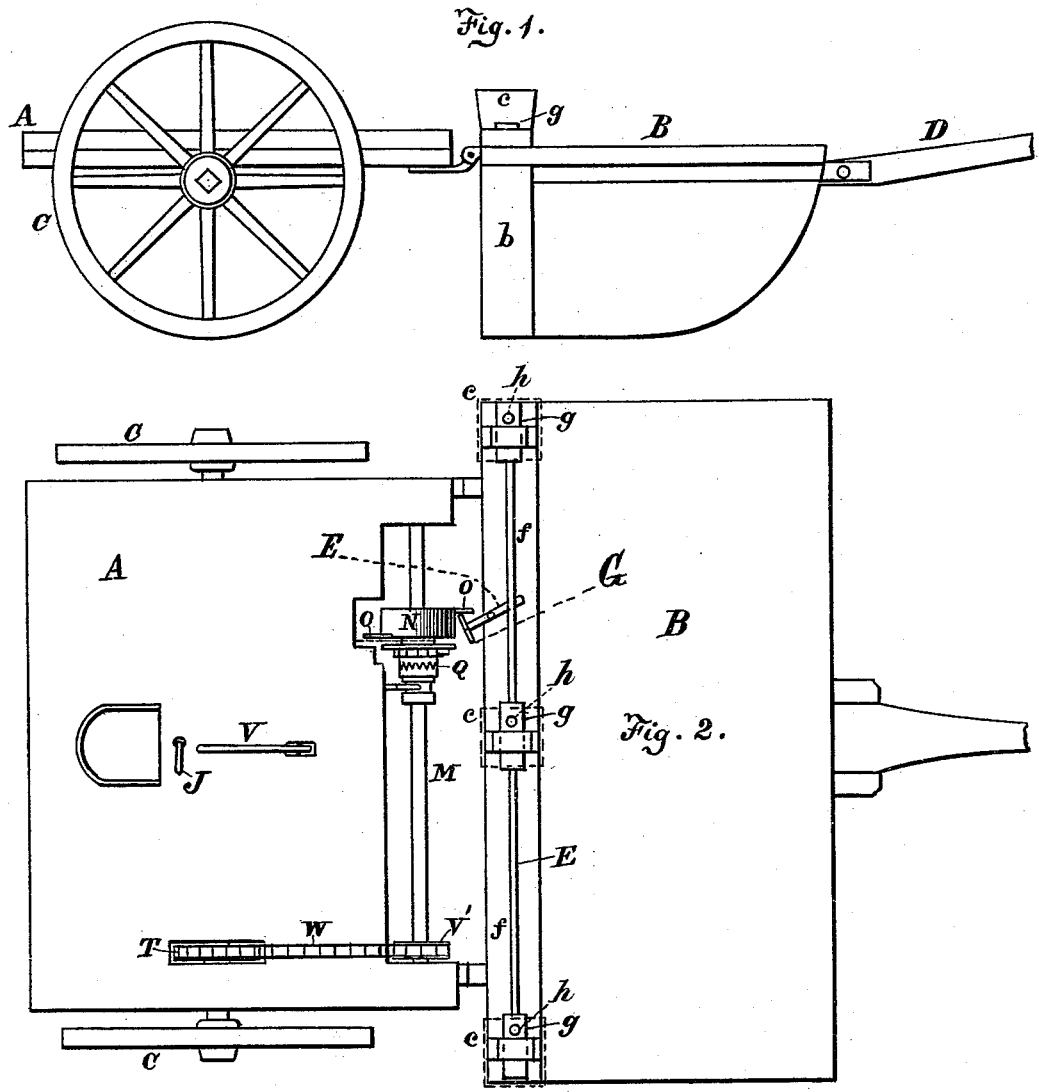
Witnesses:
Alex. Scott
Augustus Wingate
Inventor:
Daniel G. Sterling,
By Theo. Mungen,
Attorney.

D. G. STERLING.
Corn Planter and Drill.
No. 212,115.   Patented Feb. 11, 1879.
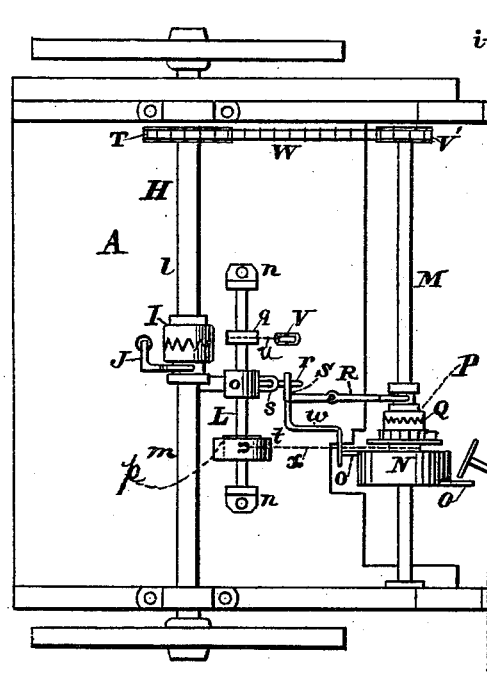
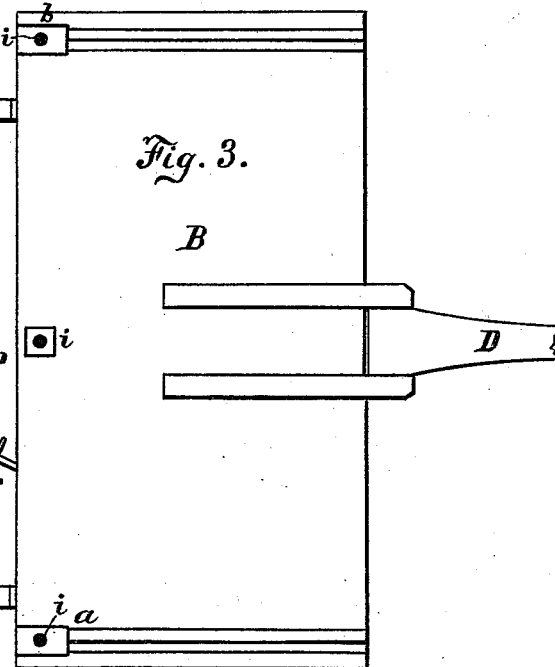
Fig. 3.
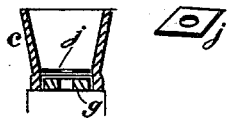
Fig. 4.   Fig. 5.
Witnesses:
Alex. Scott
Augustus Wingate
Inventor:
Daniel G. Sterling,
By Theo. Mungen,
Attorney.

UNITED STATES PATENT OFFICE.

DANIEL G. STERLING, OF LATHROP, MISSOURI, ASSIGNOR OF ONE-HALF HIS RIGHT TO THOMAS G. BALLARD, OF SAME PLACE.

IMPROVEMENT IN CORN PLANTERS AND DRILLS.

Specification forming part of Letters Patent No. 212,115, dated February 11, 1879; application filed November 27, 1878.

*To all whom it may concern:*

Be it known that I, DANIEL G. STERLING, of Lathrop, in the county of Clinton and State of Missouri, have invented certain new and useful Improvements in Corn-Planters and Corn-Drills; and I do hereby declare that the following is a full, clear, and exact description of the same, reference being had to the accompanying drawings, making a part of this specification, in which—

Figure 1 is a side elevation of a machine embodying the improvements in my invention. Fig. 2 is a top-plan, and Fig. 3 is a bottom-plan, view of the same. Figs. 4 and 5 are detail views.

This invention has relation to corn-planters and corn-drills; and it consists in the improvements in the construction of the same hereinafter fully described, and particularly pointed out in the claims.

In the accompanying drawings similar letters of reference indicate corresponding parts in the figures.

The frame is composed of two parts, A and B, hinged together immediately in front of the wheels C C, as shown. To the under side of the portion B of the frame are secured the combined discharge-spouts and markers $a$ $b$. The tongue D is also secured to the front portion, B, on the under side thereof. At the rear edge of the front portion, B, of the frame, and upon the upper side thereof, are located the hoppers $c$ and feed-slide E, which consists of a rod, $f$, extending the entire width of the frame B, having rectangular portions $g$, provided with seed-receptacles $h$. Beneath said receptacles $h$ are seed-holes $i$, communicating with the discharge-spouts $a$. The size of the seed-holes $i$ may be increased or diminished at will by inserting or removing the perforated plates $j$, to change the planter to a drill when desired, or vice versa. A lever, F, is secured to the rod $f$, and pivoted upon the frame B, and extends beyond the rear edge of the frame B, where it is provided with a triangular-shaped plate, G, as shown. The rear portion, A, of the frame is secured by boxes to the axle H, which latter is constructed in two parts, $l$ and $m$, connected by a toothed clutch, I, one half, $l'$, of which is operated by a bent forked lever, J, to connect and disconnect the parts $l$ $m$, for the purpose of throwing them in and out of gear, so that the machine may be inoperative when on the road or in turning around. The ends of the axle are square, and the wheels are fixed thereon, so that the axle will revolve with them to operate the planting mechanism, to be hereinafter described.

On the under side of the portion A of the frame, and immediately in front of the axle H, is a short shaft, L, supported in suspended boxes $n$, and carrying two drums, $o$ $p$, and a fixed pulley, $q$. The drum $o$ is located centrally on the shaft L, and has an arm, $r$, which projects up against the under face of the frame A, and passes through an eye in the end of a lateral spring, $s$, secured to the under face of A. The drum $p$ is surrounded by a circular guard, $t$, secured to its upper portion. The fixed pulley $q$ has a chain, $u$, secured to it by a pin, and the other end of said chain connects with the foot or hand lever V. A shaft, M, has its bearings at the front side of the portion A of the frame, and carries a drum, N, provided with removable arms O. A pawl and ratchet, P, and one half of a clutch, Q, are connected to the shaft M, as shown. The other half of the clutch Q slides upon the shaft M, and is operated by a pivoted lever, R, forked to embrace the sleeve of the movable half of the clutch Q at one end, and a curved depending arm, which is operated by the arm which projects from the drum $o$. A bent arm, $w$, projects from the arm S, and prevents the drum N from rotating when the clutch Q is thrown out of gear. A chain, $x$, is connected to the guard $t$ and the inner face of the ratchet-wheel P, and prevents the drum N from rotating backward when the pawl and ratchet are engaged.

A large sprocket-wheel, T, on the axle H, and a smaller sprocket-wheel, V', on the shaft M, are connected by an endless chain, W. Motion is communicated to the shaft M from the axle H through the endless chain and sprocket-wheels last described.

The central hopper is used as a marking device, and is supplied with white powder, such as farm-plaster, and does away with the trouble of marking out the ground in the usual manner, as the operator can see just where to permit the corn to be dropped.

The planter is operative at all times except when the foot or hand lever V is operated to throw it out of gear by downward pressure, and the driver can at any time press it down to prevent its dropping, if he sees that it will not drop in the proper place.

The removable arms on the drum N strike the triangular-shaped plate and operate the slide.

To convert the planter into a drill, it is only necessary to increase the number of arms in the drum N and to insert the perforated plates $j$ to lessen the size of the seed-holes.

The wheels $k$ are so fixed to the axle H that in the event of their running over a lump of dirt or a stone they will not affect the dropping mechanism too soon, because the wheel that is on the dirt or stone will slip, being counteracted by the other one.

The lateral spring $s$ operates to hold the clutch Q always in gear except when designedly disconnected by the lever V. The lever V being under the control of the driver, he can drop the grain just when and at the point he pleases.

Having thus fully described my invention, what I claim as new and useful, and desire to secure by Letters Patent of the United States, is—

1. In a seed-planter, the combination of the shaft L, having drums $o$ and $p$ and fixed pulley $q$, the drum $o$, having arm $r$, and the drum $p$, the guard $t$, with the lever V and pivoted lever R, carrying depending arm S, and operating the sliding portion of clutch Q, lateral spring $s$, and shaft M, carrying the armed drum for operating the feed-slide, substantially as set forth.

2. In a seed planter and drill, the combination of the drum N, having removable arms O, triangular plate G, and lever E, with the slide $f$ $g$ and seed-hoppers provided with the removable perforated plates $j$, the several parts constructed and relatively arranged to operate substantially as and for the purpose herein shown and described.

In testimony that I claim the foregoing improvements as above described I have hereunto set my hand and seal this 23d day of September, 1878.

DANIEL G. STERLING. [L. S.]

Witnesses:
L. E. BALLARD,
WM. SERVICE.